(No Model.)

M. G. WILDER.
VOLUMETRIC REGULATOR.

No. 352,594. Patented Nov. 16, 1886.

WITNESSES:
William K. Hewson
Chas. A. Mahony

INVENTOR
Moses G. Wilder
by his attorney
Chas. A. Rutter.

N. PETERS, Photo-Lithographer, Washington, D. C.

UNITED STATES PATENT OFFICE.

MOSES G. WILDER, OF PHILADELPHIA, PENNSYLVANIA.

VOLUMETRIC REGULATOR.

SPECIFICATION forming part of Letters Patent No. 352,594, dated November 16, 1886.

Application filed April 8, 1886. Serial No. 198,290. (No model.)

*To all whom it may concern:*

Be it known that I, MOSES G. WILDER, a citizen of the United States, residing at Philadelphia, in the county of Philadelphia and State of Pennsylvania, have invented certain new and useful Improvements in Volumetric Regulators for Furnaces, &c.; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to furnish a regulator for controlling the flow of gases to furnaces that will maintain a constant delivery of a predetermined quantity in a given time; and my invention consists of a shell or case furnished with suitable inlet and outlet passages for the gas, and with mechanism, as described hereinafter, for controlling and regulating the flow of the gas through this shell.

Figure 1:
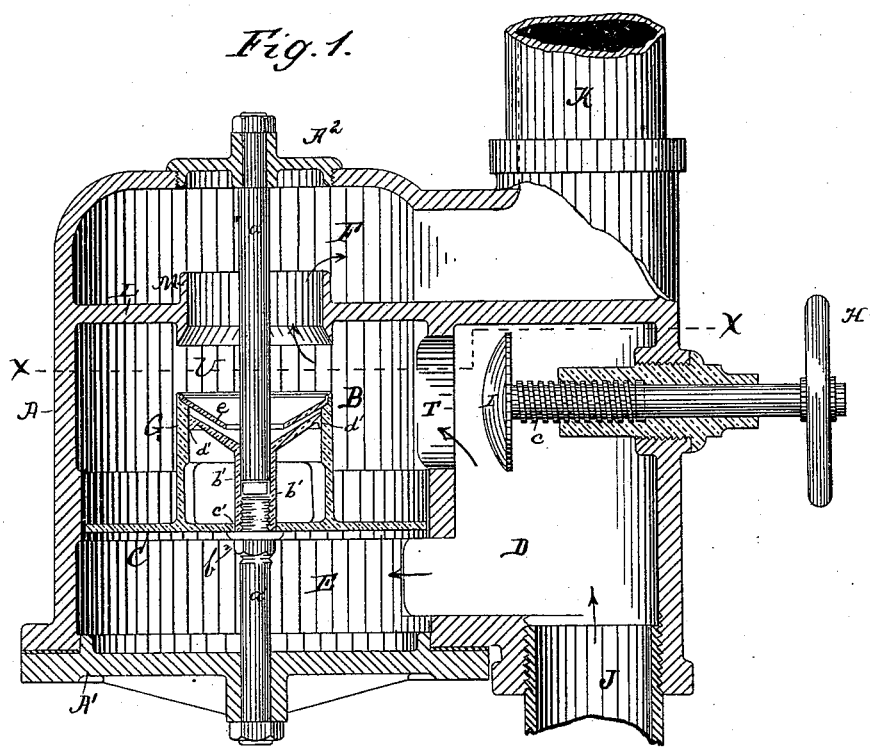
Figure 2:
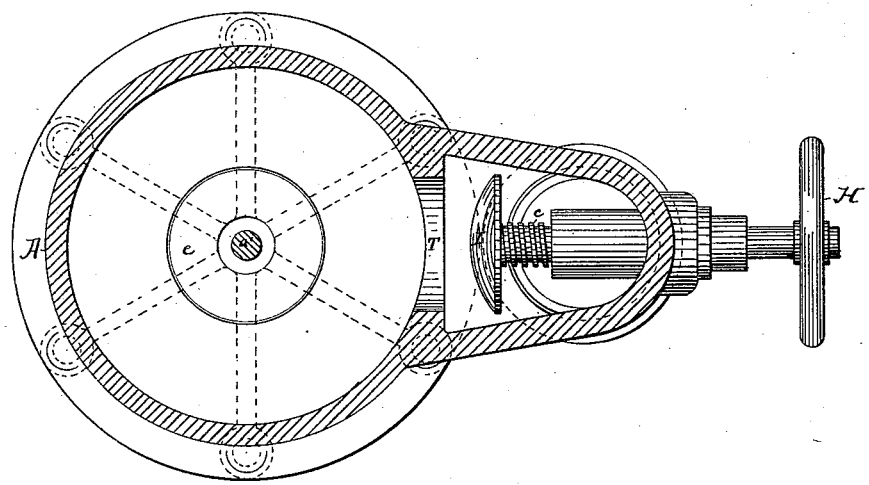

In the drawings, Figure 1 is a central sectional elevation of my invention, and Fig. 2 a section of Fig. 1 on the line $x\ x$.

A is the shell or case; D, the inlet chamber; B, the gas-chamber; F, the outlet-chamber; C, a float carrying a valve, G; $a'$, a rod, upon which is secured a disk or ring, $b'$, which guides float C and valve G in their up and down movements; E, a chamber under float C; T, an opening through which the gas passes from inlet-chamber D to gas-chamber B; I, a valve, (for regulating the opening T,) the stem of which is furnished with a screw, $c$, and a hand-wheel, H, without the case or shell, by means of which it can be adjusted.

The gas enters the regulator through the pipe J. It passes from this pipe to the inlet-chamber D, and from thence, as indicated by the arrows, to the chamber E below the float C, and through opening T to the gas-chamber B above this float. From the chamber B it passes through valve-opening U to the outlet-chamber F to the pipe K, and from this pipe to the furnace.

The opening T, through which the gas passes from the inlet-chamber D to the gas-chamber B, may be regulated so as to pass a greater or less amount of gas by means of the valve I and by means of the hand-wheel H. This regulation may be performed from without the shell or case A.

The float C is so arranged that the gas has free access to both its top and bottom sides, and an increase or decrease of initial pressure is felt upon both of these sides at practically the same time, and hence does not affect the position of the float or valve. A decrease of volume in chamber B, however, raises the float and valve, and the valve-opening U is closed to a corresponding extent, for the gas in chamber E cannot escape upward through float C, but the gas in chamber B can escape through valve-opening U; hence the relative volume of gas in chambers E and B would be changed by a decrease in the amount flowing out through opening U. Should the volume of gas in the supply increase, however, the float C and valve G would be raised, and the valve-opening U would be closed to a corresponding extent, for the gas in chamber E cannot escape upward through float C, but the gas in chamber B can escape through valve-opening U. The amount of gas which passes out of chamber B through opening U is equal to the amount which enters this chamber through opening T. A closing of opening U prevents an increased amount entering this chamber through opening T, and vice versa. A decrease of volume in the supply causes float C to fall and opening U to be opened to a corresponding extent and an increased amount to pass through opening T, and the constant delivery of a predetermined volume of gas is maintained through opening U to chamber F during all variations of volume in the supply.

$b'$ is a disk, which is screwed to the central post, $a'$, or which may form part of this post. The upper part of this disk flares out and forms a bearing, $d'$, for guiding and keeping the valve G perpendicular during its movements, and also for preventing the passage of the gas up through the center of valve G.

In the drawings, the disk $b'$ is shown as having a shank, which extends down the post $a'$ and forms a bearing, $c'$, for the float C; but, if desired, the bearing $c'$ may be directly upon the rod $a'$, or upon a ring or covering-shell upon rod $a'$, which is of less diameter than the disk $b'$. The diameter of the bearing $c'$ is as small as possible, in order to reduce the friction of contact.

The rod $a'$ is furnished with a screw-thread, as shown, and $b^2$ is a nut, which can be moved either up or down on this thread, in order to adjust the position of ring or disk $b'$ and to decrease or increase the throw of valve G and float C. The shank of the ring or disk $b'$ surrounds rod $a'$, and its bottom rests upon the top of nut $b^2$, as shown. The float C, when not in action, also rests against this nut, and is prevented by it from falling too low down.

$e$ is a re-entering cone, which is fitted to the top of the valve G, and its purpose is to carry any moisture or other impurities from the gas into the cap formed by the top of the disk $b$, from which it may evaporate or be otherwise removed, and so be kept away from the bearing $d'$.

Upon the partition L, which divides the outlet-chamber from the gas-chamber B and inlet-chamber D, is a raised lip, M, which surrounds the opening U and prevents moisture or other impurities which may collect in said outlet-chamber from falling into chamber B and valve G.

The bottom $A'$ and the top $A^2$ of the regulator are, in addition to being fastened by the screws and bolts shown in the drawings, secured by the post $a'$, the ends of which are threaded and furnished with nuts, as shown. This post may be either a solid rod, as shown, or it may be a hollow pipe.

By removing the top or bottom of the regulator, or both, access may be had to its interior for inspection, cleaning, or repairs, and as the gas inlet and outlet pipes J K are placed at one side of the regulator, the inspection or repairs can be made without breaking any joints.

Having thus described my invention, I claim—

1. A disk, float, or diaphragm and valve combined and operating so that the valve is opened automatically with an increase of delivery and closed automatically with a reduced delivery, combined with a suitable inclosing shell or case and an adjustable opening into said case, and a hand-wheel with a spindle and valve for adjusting said opening from the outside of the case, substantially as set forth.

2. A float and its valve mounted upon a centrally-located rod or post so as to rise and fall freely upon said rod or post, combined with a disk made adjustable upon said rod when required, said disk operating to balance the valve, so that it remains unaffected by variations of initial pressure and responds to variations of volume, acting upon the float only as may be required to maintain a constant delivery at varying pressures in the supply, substantially as described.

3. A float and valve mounted upon a rod or post in the regulator shell or case, combined with a chamber above the float and an adjustable gas-inlet, through which the gas enters said chamber and from which it flows to said valve, the float and its valve so arranged as to be lifted and held poised in the gas-current in a position when the gas entering said chamber flows from it through said valve at a constant predetermined rate, substantially as described.

4. A volumetric regulator consisting of the shell or case A, with removable top and bottom, $A^2$ $A'$, central rod $a'$, passing through said top and bottom, and secured thereto by nuts, as shown, valve G, float C, and inlet and outlet J K, all combined and operating substantially as set forth.

5. The combination, with a volumetric gas-regulator, substantially as described, of the valve G and the conical re-entering shell $e$, which operates to protect the contact-surfaces $d'$ from any drip or other deposit from the gas which flows past the edges of the valve, substantially as described.

6. An annular valve and float, substantially as described, mounted upon a rod or post and having its guiding-contact at the top upon the edges of a ring or disk made adjustable when required, and its guiding-contact at the bottom directly upon the rod itself, or upon a covering-shell of less diameter than that of said ring or disk, so as to reduce as far as possible the friction due to said contact, substantially as set forth.

In testimony whereof I affix my signature in presence of two witnesses.

MOSES G. WILDER.

Witnesses:
OTIS EGAN,
CHAS. A. RUTTER.